US008786206B2

(12) United States Patent
Hsieh et al.

(10) Patent No.: US 8,786,206 B2
(45) Date of Patent: Jul. 22, 2014

(54) INTELLIGENT LAMP AND CONTROL METHOD THEREOF

(75) Inventors: Kuan-Hong Hsieh, Taipei Hsien (TW);
Han-Che Wang, Taipei Hsien (TW);
Xiao-Guang Li, Shenzhen (CN);
Wen-Hsiang Lu, Taipei Hsien (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 758 days.

(21) Appl. No.: 12/915,046

(22) Filed: Oct. 29, 2010

(65) Prior Publication Data

US 2011/0266979 A1 Nov. 3, 2011

(30) Foreign Application Priority Data

Apr. 30, 2010 (CN) .......................... 2010 1 0161045

(51) Int. Cl.
*G05F 1/00* (2006.01)
*H05B 37/02* (2006.01)

(52) U.S. Cl.
USPC ............. 315/291; 315/307; 315/301; 706/15; 706/16; 706/21

(58) Field of Classification Search
CPC ........... H05B 37/0209; H05B 37/0281; Y02B 20/42; F24F 11/0012; F24F 2011/0036
USPC .................. 315/291, 307, 301; 706/15, 16, 21
See application file for complete search history.

(56) References Cited

U.S. PATENT DOCUMENTS 8,344,665 B2 * 1/2013 Verfuerth et al. ............. 315/315
2005/0248299 A1 11/2005 Chemel et al.

OTHER PUBLICATIONS

Barbato, Antimo; Borsani, Luca; Capone, Antonio; Melzi, Stefano; "Home Energy Saving Through a User Profiling System based on Wireless Sensors;" Nov. 3, 2009; ACM; BuildSys '09.*
Meng-Shivan Pan; Lun-Wu Yeh; Yen-Ann Chen; Yu-Hsuan Lin; Yu-Chee Tseng, "A WSN-Based Intelligent Light Control System Considering User Activities and Profiles," Sensors Journal, IEEE , vol. 8, No. 10, pp. 1710,1721, Oct. 2008 doi: 10.1109/JSEN.2008.2004294.*
Sheng Ping Guan, SPC Statistical Process Control, published in Sep. 2001, and by National Republic of China Society for quality, Taiwan of China, related pp. 171-179.

* cited by examiner

*Primary Examiner* — Douglas W Owens
*Assistant Examiner* — Borna Alaeddini
(74) *Attorney, Agent, or Firm* — Novak Druce Connolly Bove + Quigg LLP

(57) ABSTRACT

A method for controlling an intelligent lamp to work automatically according to people's habit includes generating a table in the memory, the table records values of a group of operational parameters of the intelligent lamp each time a user operates the intelligent lamp. Determining a frequent event and an accidental event in the predetermined time period in one day in last one week/month/year. Then obtaining all values of the operational parameters of the frequent events, and respectively calculating an accuracy value for each operational parameter according to an algorithm. In addition, controlling the lighting unit to work according to the accuracy values of the operational parameters, thus, an intelligent lamp for automatically working according to people's habit is also provided.

3 Claims, 3 Drawing Sheets

|   | Lighting Time | Brightness | Color Temperature | ... ... |
|---|---|---|---|---|
| 1 | 8:03 | 100% | 6500 | ... ... |
| 2 | 12:45 | 0% | 0 | ... ... |
| ... ... | ... ... | ... ... | ... ... | ... ... |

FIG. 2

INTELLIGENT LAMP AND CONTROL METHOD THEREOF

BACKGROUND

1. Technical Field

The present disclosure relates to intelligent lamps and, particularly, to an intelligent lamp and control method that works according to people's habit.

2. Description of Related Art

People often control lights according to a timetable regularly everyday, for, such as, getting up, eating, and working. Habitual operations everyday can become boring and time-consuming. From time to time, changes to the timetable may be needed, such as switching the lights on/off, increasing/decreasing brightness, or changing color temperature, for different times.

Therefore, it is necessary to provide an intelligent lamp and control method for automatically adjusting according to people's habit.

BRIEF DESCRIPTION OF THE DRAWINGS

Many aspects of the present disclosure should be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views.

FIG. 2 is table showing a number of groups of operational parameters of the intelligent lamp of FIG. 1, according to one exemplary embodiment.

DETAILED DESCRIPTION

Figure 1:
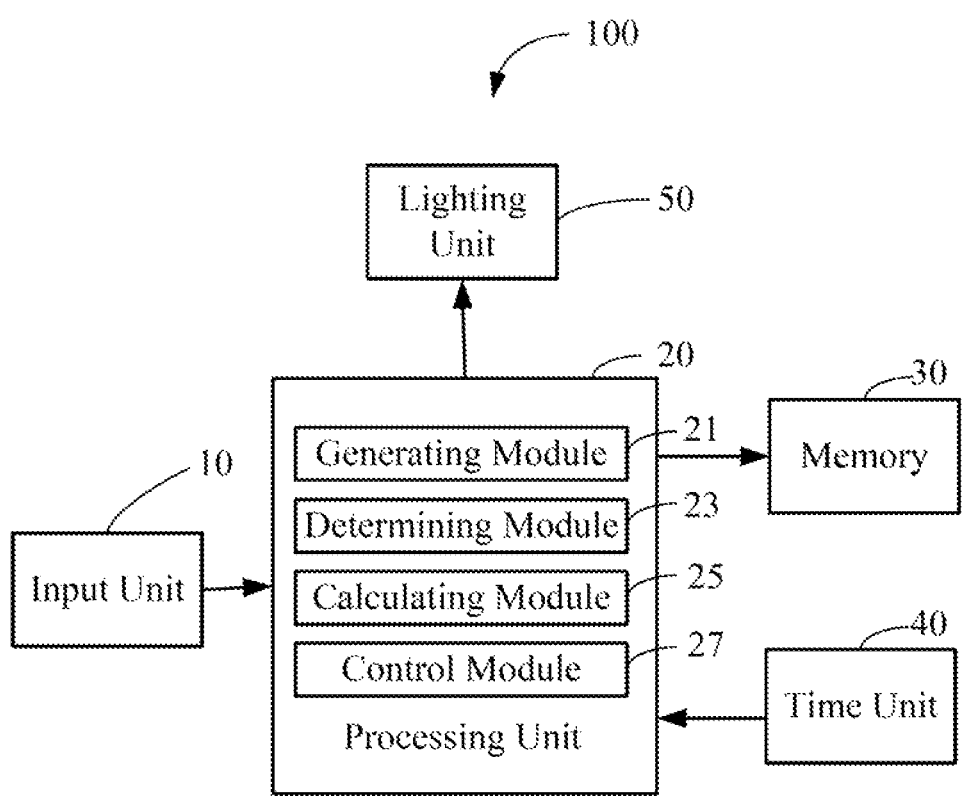
FIG. 1 is a schematic, block diagram showing an intelligent lamp, according to an exemplary embodiment.

Referring to FIG. 1, an intelligent lamp 100, according to an embodiment, includes an input unit 10, a processing unit 20, a memory 30, a time unit 40, and a lighting unit 50. In an embodiment, the intelligent lamp 100 can be but not limited to, a table lamp, a ceiling lamp or a street lamp.

The input unit 10 receives inputs from users to set a group of operational parameters to control the intelligent lamp 100. The group of operational parameters includes, but not limited to, lighting time, brightness, and color temperature. The memory 30 supplies space to store the operational parameters and other data. The time unit 40 supplies current time. The lighting unit 50 controls the intelligent lamp 100 to work under the control of the processing unit 20.

The processing unit 20 includes a generating module 21, a determining module 23, a calculating module 25, and a control module 27.

The generating module 21 generates a table in the memory 30. The table records values of a group of operational parameters of the intelligent lamp 100 each time when a user operates the intelligent lamp 100.

As shown in FIG. 2, the table includes a number of columns, for example, a lighting time column, a brightness column, and a color temperature column. Each entry under the lighting time column records a time value when the user operates the intelligent lamp 100. Each entry under the brightness column records a brightness value of the intelligent lamp 100 at a corresponding lighting time. Each entry under the color temperature column records a color temperature value of the intelligent lamp 100 at a corresponding lighting time.

The determining module 23 determines a frequent event and an accidental event in a predetermined time period in one day in the last week/month/year. The predetermined time period can be pre-set according to user's habit through the input unit 10. The method of determining the frequent event and the accidental event may be obtaining times of turning on/off in the predetermined time period in the last one week/month/year, comparing the times of turning on/off with a predetermined value. If the time of turning on/off is greater than the predetermined value, the turning on/off in the predetermined time period in one day in last one week/month/year is determined to be the frequent event. Otherwise, the turning on/off in the predetermined time period in one day in last one week/month/year is determined to be the accidental event. For example, supposing the predetermined time period is 7:30-9:30, and in the last month, the predetermined value is 15. If the times of turning on the intelligent lamp 100 in 7:30-9:30 in the day in the last month is more than 15, then turning on in 7:30-9:30 in the day in the last month is regarded as the frequent event. If turning on at 7:30-9:30 in the day is less than 15 times in the last month it is regarded as the accident event.

The calculating module 25 obtains all values of the operational parameters of the frequent events, and respectively calculates an accuracy value for each operational parameter according to an algorithm. The accuracy value of each operation parameter is a great probability value that the corresponding operational parameter has when the frequent event happens. For example, regarding to the frequent event, the turning on of the intelligent lamp 100 at 7:30-9:30, the accuracy value of the lighting time represents a time in which the user would most probably turn on the intelligent lamp 100. The accuracy value of the brightness represents the brightness value, which the intelligent lamp 100 would be adjusted to at the corresponding lighting time, and the accuracy value of the color temperature represents the color temperature value which the intelligent lamp 100 would be adjusted to at the corresponding lighting time.

In an exemplary embodiment, the algorithm is T/2, therein, T=MAX−MIN, MAX is a maximum value of the operational parameter, MIN is a minimum value of the operational parameter. Take the lighting time for example, the calculating module 25 obtains all values of the lighting times of the frequent events, and calculates the accuracy value of the lighting time of the frequent events according to the algorithm of T/2, therein, T=MAX−MIN, MAX is a maximum value of the lighting time, MIN is a minimum value of the lighting time.

In another exemplary embodiment, the algorithm is (X−U)/(T/2), therein, X is an average value of all values of each operational parameter of the frequent events, T=MAX−MIN, U=(MAX+MIN)/2, MAX is a maximum value of the operational parameter, MIN is a minimum value of the operational parameter. Take the lighting time for example, the calculating module 25 obtains all values of the lighting times of the frequent events, and calculates the accuracy value of the lighting time of the frequent events according to the algorithm of (X−U)/(T/2), therein, X is the average value of the lighting time of the frequent event, T=MAX−MIN, U=(MAX+MIN)/2, MAX is a maximum value of the lighting time, MIN is a minimum value of the lighting time.

The control module 27 controls the lighting unit 50 to work according to the accuracy values of the operational parameters. For example, the control module 27 determines if the current time is the accuracy value of the lighting time, if yes, the control module 27 controls the lighting unit 50 to work according to the accuracy values of the brightness and color temperature.

Figure 3:
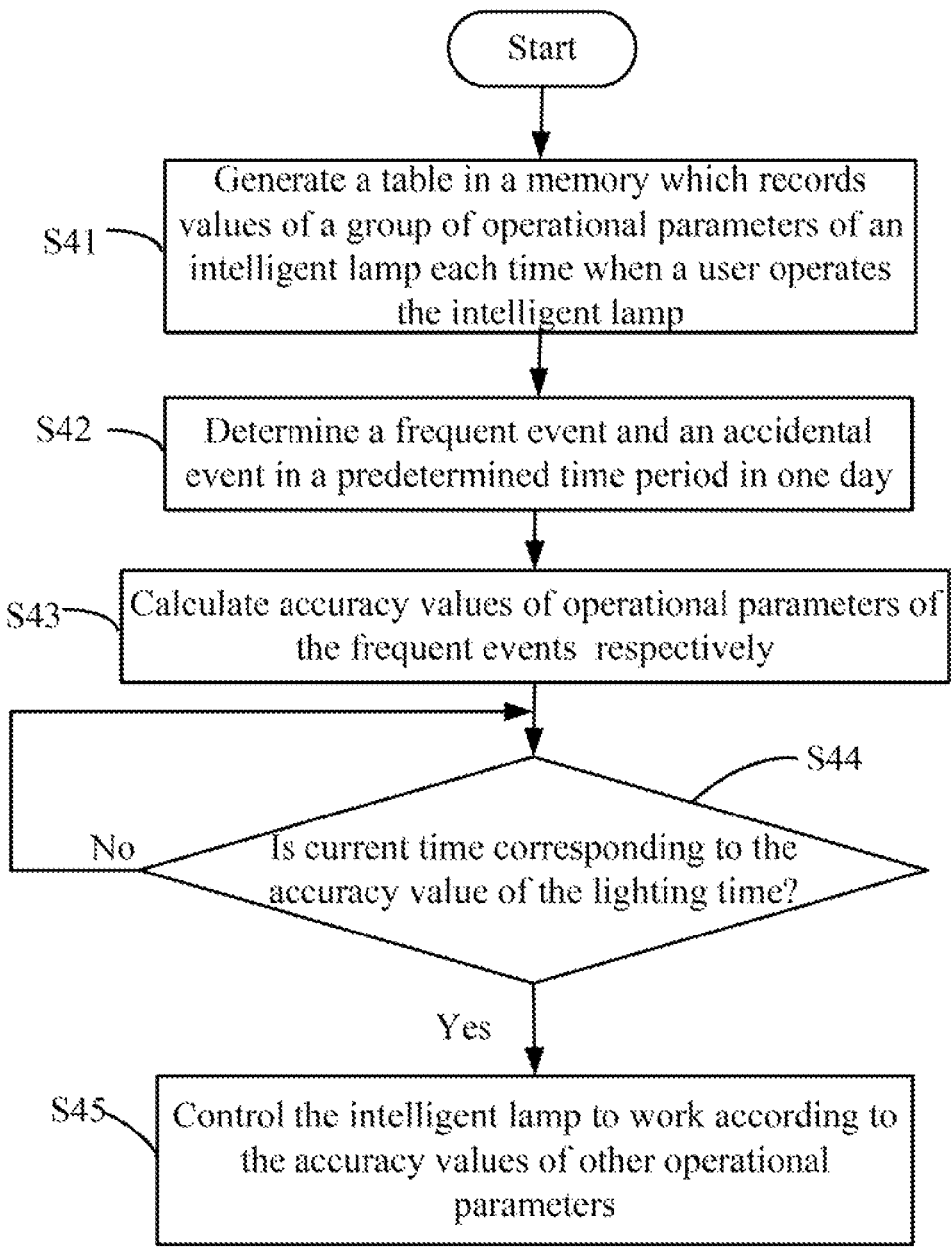
FIG. 3 is a flowchart of implementing a method of controlling the intelligent lamp of FIG. 1, according to one exemplary embodiment.

FIG. 3 is a flowchart of implementing a method of controlling the intelligent lamp 100 of FIG. 1, in accordance with an exemplary embodiment.

In step S41, the creating module 21 generates the table in the memory 30 which records values of a group of operational parameters of the intelligent lamp 100 each time when a user operates the intelligent lamp 100.

In step S42, the determining module 23 determines the frequent event and the accidental event in the predetermined time period in one day in last one week/month/year frequent event.

In step S43, the calculating module 25 obtains all values of the operational parameters of the frequent events, and respectively calculates an accuracy value for each operational parameter according to the algorithm.

In step S44, the control module 27 determines if the current time is corresponding to the accuracy value of the lighting time, if yes, the method goes to step S45, if no, the method goes back to step S44.

In step S45, the control module 27 controls the lighting unit 50 to work according to the accuracy values of other operational parameters.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An intelligent lamp for working according to habit of people, the lamp comprising:
    an input unit to receive user inputs;
    a memory to store data;
    a time unit to supply current time;
    a lighting unit; and
    a processing unit comprising:
        a creating module to generate a table in the memory, wherein the table records values of a plurality of groups of operational parameters of the intelligent lamp generated by each time a user operates the intelligent lamp, each of the groups comprising a lighting time representing the time the user operates the intelligent lamp, and further comprising a plurality of operational parameters of the intelligent lamp corresponding to the lighting time;
        a determining module to determine whether one operation on the intelligent light in a predetermined time period in one day in last one week/month/year is a frequent event or an accidental event;
        a calculating module to obtain all values of the operational parameters of the frequent events, and respectively calculate an accuracy value for each operational parameter according to an algorithm, wherein the algorithm is $(X-U)/(T/2)$, wherein X is an average value of all values of each of the operational parameters of the frequent event, $T=MAX-MIN$, $U=(MAX+MIN)/2$, MAX is a maximum value of all values of each of the operational parameters, and MIN is a minimum value of all values of each of the operational parameters; and
        a control module to control the lighting unit to work according to the accuracy values of each of the operational parameters when the current time is the lighting time of the one group of operational parameters.

2. An intelligent lamp for working according to habit of people, the lamp comprising:
    an input unit to receive user inputs;
    a memory to store data;
    a time unit to supply current time;
    a lighting unit; and
    a processing unit comprising:
        a creating module to generate a table in the memory, wherein the table records values of a plurality of groups of operational parameters of the intelligent lamp generated by each time a user operates the intelligent lamp, each of the groups comprising a lighting time representing the time the user operates the intelligent lamp, and further comprising a plurality of operational parameters of the intelligent lamp corresponding to the lighting time;
        a determining module to determine whether one operation on the intelligent light in a predetermined time period in one day in last one week/month/year is a frequent event or an accidental event;
    a calculating module to obtain all values of the operational parameters of the frequent events, and respectively calculate an accuracy value for each operational parameter according to an algorithm, wherein the algorithm is $T/2$, wherein $T=MAX-MIN$, MAX is a maximum value of all values of each of the operational parameters, and MIN is a minimum value of all values of each of the operational parameters; and
    a control module to control the lighting unit to work according to the accuracy values of each of the operational parameters when the current time is the lighting time of the one group of operational parameters.

3. A method for controlling an intelligent lamp to work automatically according to habit of people comprising:
    generating a table in the memory, wherein the table records values of plurality of groups of operational parameters of the intelligent lamp generated by each time a user operates the intelligent lamp, each of the groups comprising a lighting time representing the time the user operates the intelligent lamp, and further comprising a plurality of operational parameters of the intelligent lamp corresponding to the lighting time;
    determining whether one operation on the intelligent light in a predetermined time period in one day in last one week/month/year is a frequent event or an accidental event;
    obtaining all values of the operational parameters of the frequent events, and respectively calculating an accuracy value for each operational parameter according to an algorithm, wherein the algorithm is $(X-U)/(T/2)$, wherein X is an average value of all values of each of the operational parameters of the frequent events, $T=MAX-MIN$, $U=(MAX+MIN)/2$, MAX is a maximum value of all values of each of the operational parameters, and MIN is a minimum value of all values of each of the operational parameters; and
    controlling the intelligent lamp to work according to the accuracy values of each of the operational parameters when the current time is the lighting time of the one group of operational parameters.

* * * * *